United States Patent
Ignatin

(10) Patent No.: US 7,113,865 B2
(45) Date of Patent: Sep. 26, 2006

(54) ROADWAY TRAVEL DATA EXCHANGE NETWORK

(76) Inventor: Gary R. Ignatin, 16 Sorrento Ct., Newport Coast, CA (US) 92657

( * ) Notice: Subject to any disclaimer, the term of this patent is extended or adjusted under 35 U.S.C. 154(b) by 206 days.

(21) Appl. No.: 10/736,819

(22) Filed: Dec. 15, 2003

(65) Prior Publication Data
US 2005/0131629 A1  Jun. 16, 2005

(51) Int. Cl.
*G01C 21/26* (2006.01)

(52) U.S. Cl. .............. 701/200; 701/300; 701/207; 455/456.1

(58) Field of Classification Search ........ 701/201, 701/300; 116/DIG. 43; 340/988, 905
See application file for complete search history.

(56) References Cited

U.S. PATENT DOCUMENTS

| 4,023,017 | A * | 5/1977 | Ceseri ............... 701/118 |
| 6,236,933 | B1 * | 5/2001 | Lang ................ 701/117 |
| 6,574,548 | B1 * | 6/2003 | DeKock et al. ....... 701/117 |
| 6,745,125 | B1 * | 6/2004 | Saraga et al. ........ 701/207 |
| 6,804,524 | B1 * | 10/2004 | Vandermeijden ..... 455/456.1 |
| 6,925,378 | B1 * | 8/2005 | Tzamaloukas ........ 701/200 |

\* cited by examiner

*Primary Examiner*—Thomas G. Black
*Assistant Examiner*—Marie A. Weiskopf
(74) *Attorney, Agent, or Firm*—McAndrews, Held & Malloy, Ltd.

(57) ABSTRACT

Disclosed herein are systems and methods for exchange of travel data in a roadway information system associated with a first roadway vehicle and a second roadway vehicle. In one embodiment, the roadway information system may comprise, for example, a first mobile client system associated with the first roadway vehicle, a second mobile client system associated with the second roadway vehicle, a wireless communication network, and a processing system communicatively coupled to the wireless communication network. The first mobile client system may deliver first travel related data to the processing system via the wireless communication network. The processing system may deliver second travel related data to the second mobile client system via the wireless communication network, where the second travel related data relates at least in part to the first travel related data.

21 Claims, 8 Drawing Sheets

ROADWAY TRAVEL DATA EXCHANGE NETWORK

RELATED APPLICATIONS

[Not Applicable]

INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Information regarding vehicular travel is currently gathered using a variety of techniques. For example, information relating to vehicular accidents is gathered through eyewitness reports to police or emergency personnel at the scene, or from motorist telephone reports received from emergency phones or cellular phones. Traffic is also observed visually from helicopters, which may utilize video cameras to record such traffic and facilitate the reporting of various travel characteristics. Video cameras are also placed adjacent to certain roadways to allow remote observation of travel conditions in front of the camera. In addition, sensors may be placed on certain roadways in order to count vehicles. Motorists obtain the gathered travel information through a variety of means, including television reports, radio reports, and internet websites.

Motorist reports of travel data are manually made on an ad hoc basis, and thus there often is no information regarding travel conditions in an area of interest. Similarly, helicopters, video cameras and sensors currently are only deployed in certain areas. Since the cost of such monitoring devices is very high, and since they require trained personnel to operate them, there are significant cost barriers that prevent such monitoring devices from being used to cover a significant percentage of roadways simultaneously. Additionally, because information gathering from motorist report, video cameras, and helicopters is performed manually, there can be significant latency when delivering the travel information.

Another problem with current methods is that it is difficult for motorists to get travel information for a specific area whenever they want such information. Television and radio broadcasts of travel information provide the same report to all listeners and viewers, and thus generally cover only the most commonly used roadways and the most serious travel problems. This forces the motorist to listen or watch a report, which usually contains far more information than he or she desires, and sometimes does not even contain the desired information at all. Additionally, the information is broadcast on the relevant station's schedule, and not necessarily when the motorist needs the information. One effect is that information can be stale by the time it is reported to the motorist, either because the travel condition has cleared or because the motorist has passed the point at which he could have selected a different route to his destination. Some internet websites offer a more specific report providing only information for the areas of interest to the user, but these typically are not accessible to motorists while they are operating their vehicles.

Vehicles today may contain equipment that utilizes vehicle location information to support theft recovery or operator assistance, e.g., LoJack™ and OnStar™ equipment. The equipment communicates wirelessly with remote central systems to provide such support.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in, for example, systems and methods for exchange of travel data in a roadway information system associated with a first roadway vehicle and a second roadway vehicle. In one embodiment, the roadway information system may comprise, for example, a first mobile client system associated with the first roadway vehicle, a second mobile client system associated with the second roadway vehicle, a wireless communication network, and a processing system communicatively coupled to the wireless communication network. The first mobile client system may deliver first travel related data to the processing system via the wireless communication network. The processing system may deliver second travel related data to the second mobile client system via the wireless communication network, where the second travel related data relates at least in part to the first travel related data.

In another embodiment, the roadway information system may comprise, for example, a wireless communication network, a plurality of mobile client systems communicatively coupled to the wireless communication network, and a processing system communicatively coupled to the wireless communication network. Each of the plurality of mobile client systems may deliver travel related information via the wireless communication network. In addition, the processing system generates and communicates data based on the travel related information delivered by each of the plurality of mobile client systems.

In yet another embodiment, a method in accordance with the present invention may comprise, for example, one or more of the following: delivering a first travel related data by a first mobile client system to a processing system via a wireless communication network, the first mobile client system associated with a first roadway vehicle; generating a second travel related data by the processing system, the second travel related data related at least in part to the first travel related data; and delivering the second travel related data by the processing system to a second mobile client system via the wireless communication network, the second mobile client system associated with a second roadway vehicle.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates to a network supporting the collection, processing and exchange of roadway travel data. The collection is performed automatically, or upon request, from a plurality of roadway vehicles and supporting collection systems. After processing the collected travel data, the processed data and instructions are delivered to the collecting roadway vehicles and to other client systems.

Figure 1:
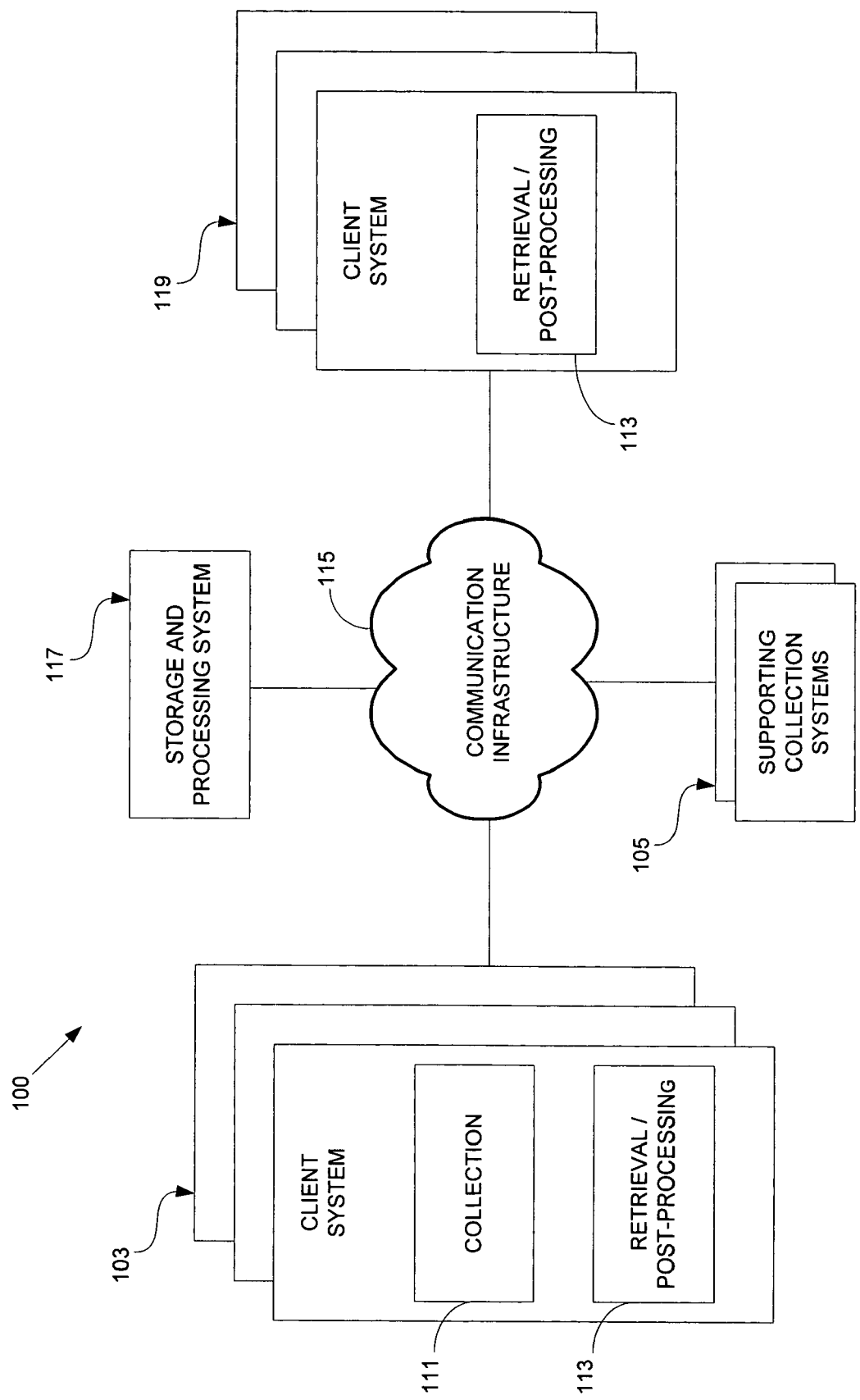
FIG. 1 is a diagram illustrating an embodiment of a roadway travel data exchange network supporting collection, processing and delivery of travel data, in accordance with various aspects of the present invention.

FIG. 1 is a diagram illustrating a roadway travel data exchange network 100 supporting collection, processing and exchange of travel data, in accordance with various aspects of the present invention. The roadway travel data exchange network 100 comprises a communication infrastructure 115, pluralities of client systems 103 and 119, supporting collection systems 105, and a storage and processing system 117. The plurality of client systems 103 comprise collection systems 111 and retrieval/post-processing systems 113. However, the plurality of client systems 119 comprise retrieval/post-processing systems 113 and no collection systems 111.

The plurality of client systems 103 collect travel data and deliver the collected data to the storage and processing system 117 via the communication infrastructure 115. The storage and processing system 117 also receives collected travel data from the supporting collection systems 105. These collection processes occur both periodically and in real time.

To support the pluralities of client systems 103 and 119, the storage and processing system 117 correlates, combines and otherwise processes the collected travel data to generate processed data and instructions. The processed data and instructions are delivered to the pluralities of client systems 103 and 119 via the communication infrastructure 115 for post-processing. Post-processing by the pluralities of client systems 103 and 119 may include, for example, communicating the processed data to the user, further computation, control and storage.

Some of the pluralities of client systems 103 and 119 are installed in roadway vehicles. Others of the pluralities of client systems 103 and 119 are portable devices that may be carried inside roadway vehicles. Yet other of the pluralities of client systems 103 and 119 are neither installed nor carried inside roadway vehicles. The plurality of client systems 103, installed or associated with roadway vehicles: (1) collect travel data via the collection systems 111; (2) exchange collected travel data with the storage and processing system 117, the client systems 119, others of the client systems 103, and the supporting collection systems 105; and (3) post-process travel data retrieved from the storage and processing system 117, the client systems 119, others of the client systems 103, and the supporting collection systems 105. Although the plurality of client systems 119 do not perform collection, they also post-process such retrieved and received travel data via the communication infrastructure from the systems 103, 105, 117 and other client systems 119.

The pluralities of client systems 103 and 119 may be categorized as multi-purpose or dedicated client systems. The characteristic feature of a multi-purpose client system is that it may perform various functions related to the travel data as well as additional functions that are not related to travel data. A dedicated client system can only perform functions related to the travel data.

Collection of travel data by the plurality of client systems 103 is accomplished in several ways. Some of the plurality of client systems 103 receive instructions from the systems 117, 119 and 105 and from others of the client systems 103 to deliver, or collect and deliver, certain travel data. Any of the plurality of client systems 103 may be pre-configured or instructed to regularly collect and deliver such travel data without awaiting specific requests. Such "pre-arranged" collection and delivery can occur continuously or as travel data becomes available. The collection and delivery process performed by each of the plurality of client systems 103 may be activated or deactivated via the communication infrastructure or through direct interaction with the client systems 103. The retrieval and post-processing of the plurality of client systems 103 may be similarly activated or deactivated.

Another way for collecting information is for the plurality of client systems 103 to automatically initiate collection (and subsequent delivery) of travel data. For example, upon sensing motion, periodic collection and delivery might be automatically initiated by the client systems 103. Such client system 103 might also periodically collect and deliver the moving vehicle's geographic location, its speed, direction and other travel data. Alternatively, the plurality of client systems 103 may be triggered manually to initiate collection and/or delivery of travel data.

After processing travel data delivered by one of the plurality of client systems 103, the storage and processing system 117 may return processed travel data and/or instructions to the delivering one of the plurality of client systems 103. In addition, the storage and processing system 117 delivers the processed travel data and related instructions to others of the pluralities of client systems 103 and 119. For example, processed travel data may be delivered to one of the client systems 103 in response to travel data collected from another of the client systems. Any of the pluralities of client systems 103 and 119 that receive the processed travel data or related instructions may forward same or post-process and forward post-processed data or instructions to yet others of the pluralities of client systems 103 and 119.

The roadway travel data exchange network 100 is enhanced with capability of receiving additional information that may relate to travel. Such additional travel-related information may be collected by supporting collection systems 105. For example, various governmental agencies or news organizations will have the capability to contribute travel-related data. Governmental agencies that may contribute travel-related data to the roadway travel data exchange network include, for example, a local city police department, a state police department, a sheriffs department, a highway patrol, and a meteorological agency. The travel-related data may be collected by using a client system 103, in a similar manner as discussed above. The travel-related data may comprise, for example, information about the number of vehicles that pass through a certain part of a road, vehicle speed, and direction of travel. If the travel-related data is collected by the governmental agency representative using a device similar to a client system 103, the device may automatically collect and transmit the travel-related data to the storage and processing system 117 for further processing. The governmental agency representative may also collect travel-related data by observation and then enter it into the roadway travel data exchange network by transmitting it directly to the storage and processing system 117. For example, a police officer may be monitoring a busy road intersection and may observe a traffic accident. As a result of the accident, all lanes of the road may become blocked and traffic flow may quickly deteriorate. The police officer may then transmit to the storage and processing system 117 his exact location and the fact that the specific road has been blocked in both directions due to a traffic accident.

The supporting collection systems 105 may comprise, for example, weather-related data collection systems. The weather-related data may be automatically collected by weather sensors placed at key intersections, highways, or roads. The weather-related data may include, for example, outside temperature, precipitation amount and emergency weather data (such as information for an approaching tornado). Certain weather-related data may be entered into the roadway travel data exchange network and transmitted to the storage and processing system 117 via a client system 103. The supporting collection systems 105 may also comprise a meteorological data collection system that delivers travel data in the form of weather information to the storage and processing system 117.

The supporting collection systems 105 also deliver travel data directly to the client systems 103 and 119 for post-processing via the communication infrastructure 115. Instructions may also be delivered by the supporting collection systems 105 to the storage and processing system 117 or the client systems 103 and 119 via the communication infrastructure 115.

The pluralities of client systems 103 and 119 have display capabilities so that collected and processed travel data may be displayed for a user as part of the post-processing functionality of the retrieval/post-processing systems 113. For example, some of the plurality of client systems 103 transmit geographic location (corresponding to either the location of the client system or any other selected location) to the storage and processing system 117, requesting related weather and speed information. In response to such request, the storage and processing system 117 uses the geographic location to access stored travel data to produce the related weather and speed information for delivery to the requesting client system.

The communication infrastructure 115 may comprise a single communication network or a plurality of communication networks. Such networks may comprise wired and wireless portions. More specifically, collection of information and transmission of the collected information via the communication infrastructure 115 may be accomplished by using wireless transmission methods, such as General Packet Radio Service (GPRS) or Wideband Code Division Multiple Access (WCDMA). Collection and transmission on the communication infrastructure 115 may also be accomplished using radio, 802.11 network, ultrawideband communication, or any other means that allow sufficient freedom of movement. Delivery of information on the communication infrastructure 115 can be accomplished by using the same wireless transmission methods that are used for transmission of the collected information. In addition, delivery via the communication infrastructure 115 may be accomplished by using a cable infrastructure, a satellite network infrastructure, a digital subscriber line (DSL) infrastructure, an Internet infrastructure, an Internet infrastructure, a wired infrastructure, a closed communication infrastructure, and a local area network. Complimentary technology exists on the roadway travel data exchange network 100, including the storage and processing system 117, and the client systems 103 and 119 in order to use the communication infrastructure and process travel data on the roadway travel data exchange network.

In an embodiment of the present invention, the roadway travel data exchange network may comprise a plurality of storage and processing systems. For example, in order to increase efficiency in the exchange of information, a storage and processing system may be placed near several major roads or intersections so that travel data may be reported to the storage and processing system which is closest to the reporting vehicle. The plurality of storage and processing systems may be connected together, or to a main storage and processing system, via the communication infrastructure 115. The plurality of processing systems may each be deployed to provide different services or portions of an overall service offering. In such cases, the client systems may employ post-processing that correlates or otherwise combines the services or service information delivered by the plurality of processing systems.

In another embodiment of the present invention, a plurality of client systems 103 may be utilized, as well as a plurality of client systems 119. Travel data that is collected by one or more of the collection systems 111 on the client systems 103 may be transmitted to, and processed by, a storage and processing system. Subsequent results may be utilized by the same client systems 103 which collected the travel data, or by other client systems 103. The same results, however, may also be utilized by one or more of the retrieval/post-processing systems 113 on the plurality of client systems 119.

Figure 2:
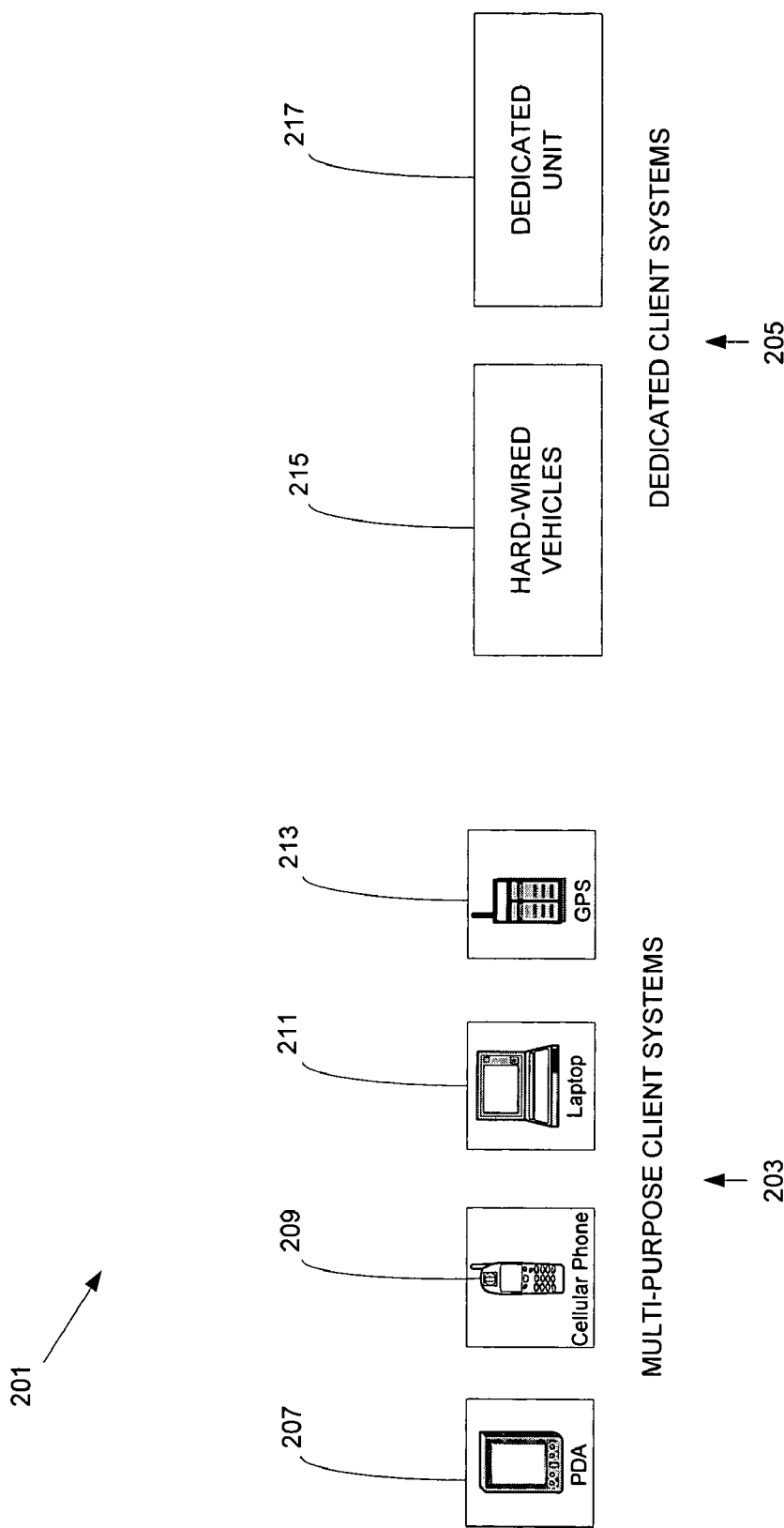
FIG. 2 is a diagram illustrating a plurality of client systems on the roadway travel data exchange network of FIG. 1, for example, in accordance with various aspects of the present invention.

FIG. 2 is a diagram illustrating a plurality of client systems on the roadway travel data exchange network of FIG. 1, for example, in accordance with various aspects of the present invention. The plurality of client systems 201 may comprise one or more of the multipurpose client systems 203 and/or one or more of the dedicated client systems 205. More specifically, the multipurpose client system 203 may be, for example, one or more of a personal digital assistant (PDA) 207, a cellular phone 209, a laptop computer 211, and a global positioning system (GPS) device 213. The multipurpose client system 203 is enabled to collect, transmit, receive and deliver travel data. However, the multipurpose client system 203 may perform additional functions as well. For example, the PDA 207 may store and recall personal information. The dedicated client system 205 may only perform functions related to the travel data. The dedicated client system 205 may comprise a client system 215 physically embedded ("hardwired") in the vehicle. A dedicated client system 205 may also be designed as a portable dedicated unit 217.

Figure 3:
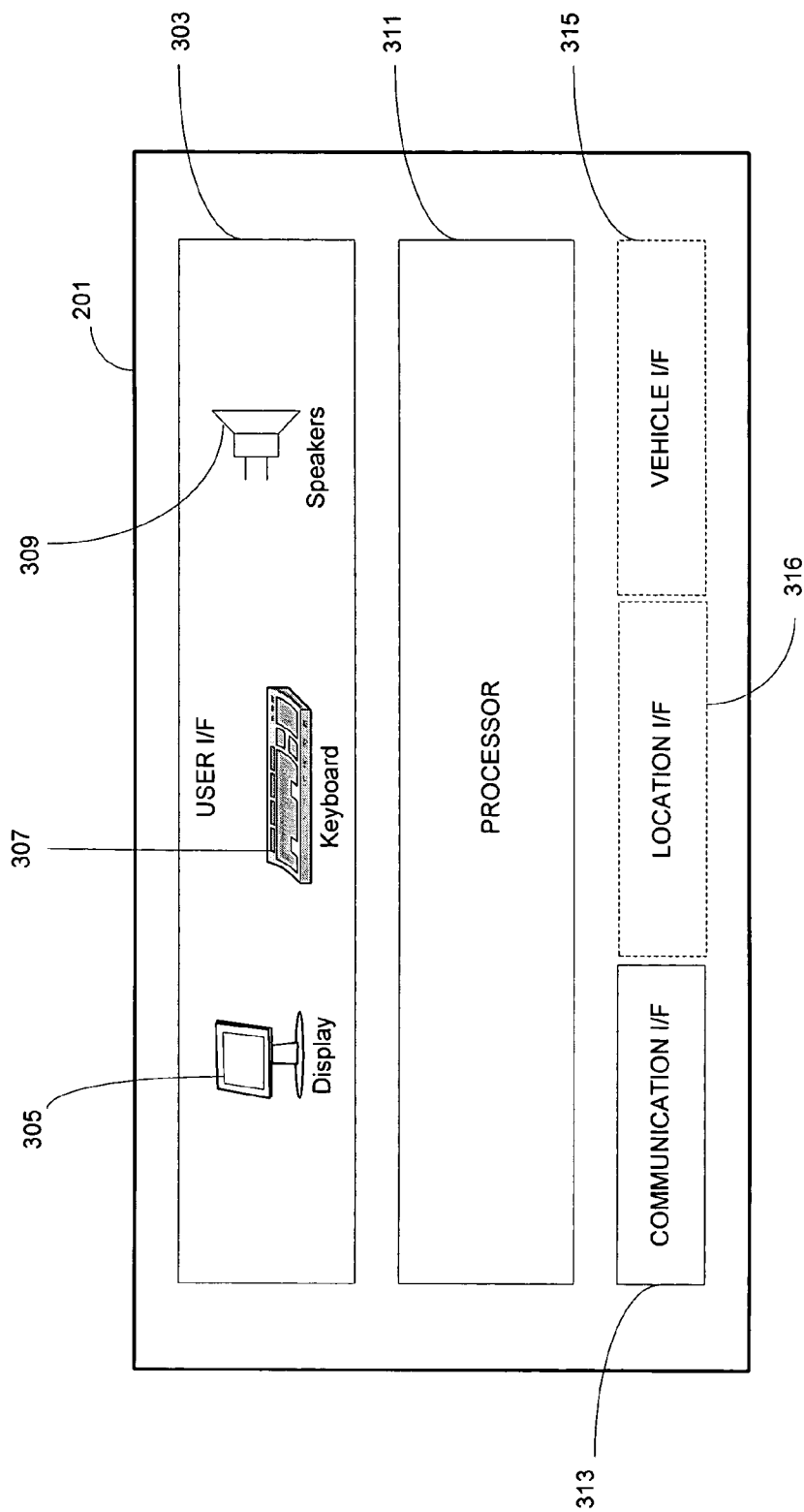
FIG. 3 is a diagram illustrating a more specific embodiment of a client system on the roadway travel data exchange network of FIG. 1, for example, in accordance with various aspects of the present invention.

FIG. 3 illustrates a more specific embodiment of one of the client systems 201 in the roadway travel data exchange network of FIG. 1, for example, in accordance with various aspects of the present invention. In order to accomplish efficient exchange of travel data, the client system 201 comprises a user interface 303, a processor 311 and a communication interface 313.

The client system 201 is adapted to collect, transmit, receive and deliver travel data. Where the client system 201 is "dedicated" or embedded in a vehicle, a vehicle interface 315 supports the collection of travel data related to the vehicle in which it is embedded. Such travel data may comprise, for example, information on the vehicle speed, tire pressure, airbag deployment, etc.

In the present embodiment, geographic location information of a vehicle is determined through location circuitry. If the location circuitry is present in the vehicle in which the client system is located, then the location circuitry will deliver the geographic location information to the client system 201 via the vehicle interface 315. However, if the vehicle lacks location circuitry, the client system 201 may comprise location circuitry within a location interface 316. For example, in one embodiment, the location interface 316 comprises GPS (Global Positioning System) circuitry. In other embodiments, geographic location may be determined by any sufficiently reliable mechanisms for determining location, such as mechanisms employing triangulation techniques. The GPS circuitry may also assist in determining speed and direction of a vehicle if such travel data may not be collected directly via the vehicle interface 315.

The user interface 303 comprises a keyboard 307, which may be used to enter travel data manually or otherwise interact with the client system 201. For example, the keyboard might be used to request travel data from the storage and processing system 117. Of course, any other user input devices such as a touchscreen, mouse, buttons, dials or switches might also or alternatively be used.

Travel data which is delivered to the client system 201 is displayed on a display 305. The client system 201 may also provide for audible notification of the received travel data via speakers 309. Information which is entered or received via the client system 201 is processed by the processor 311. A communication interface 313 communicatively couples the client system 201 with the communication infrastructure so as to provide access to the storage and processing system 117, for example. Through the communication interface 313, processed, post-processed and collected travel data is exchanged. For example, the storage and processing system 117 delivers processed travel data to the client system 201 for display and audible output on the display 305 and speakers 309 respectively.

Figure 4:
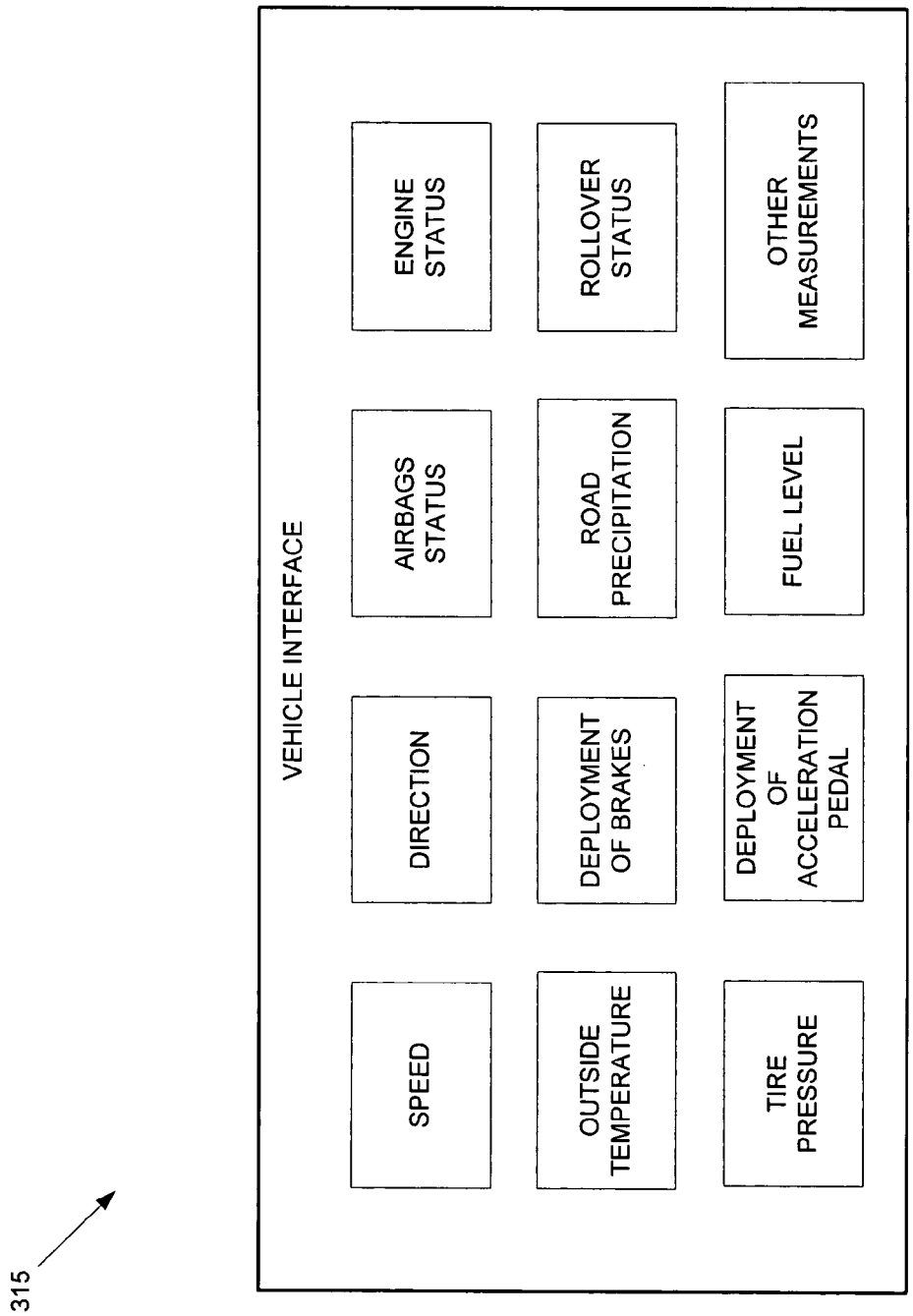
FIG. 4 is a diagram illustrating an embodiment of a vehicle interface on the plurality of client systems of FIG. 2, for example, in accordance with various aspects of the present invention.

FIG. 4 illustrates a diagram of an embodiment of a vehicle interface of the client system of FIG. 2, for example, in accordance with various aspects of the present invention. The vehicle interface 315 provides functionality for collecting travel data that is related to the vehicle in which it is embedded. Travel data that may be collected by a client system may include, for example, a geographic location, a speed, a direction, an airbag status, an engine status, an outside temperature, a deployment status of vehicle brakes, a road precipitation status, a rollover status, a tire pressure status, a deployment status of an acceleration pedal, and a fuel level.

Figure 5:
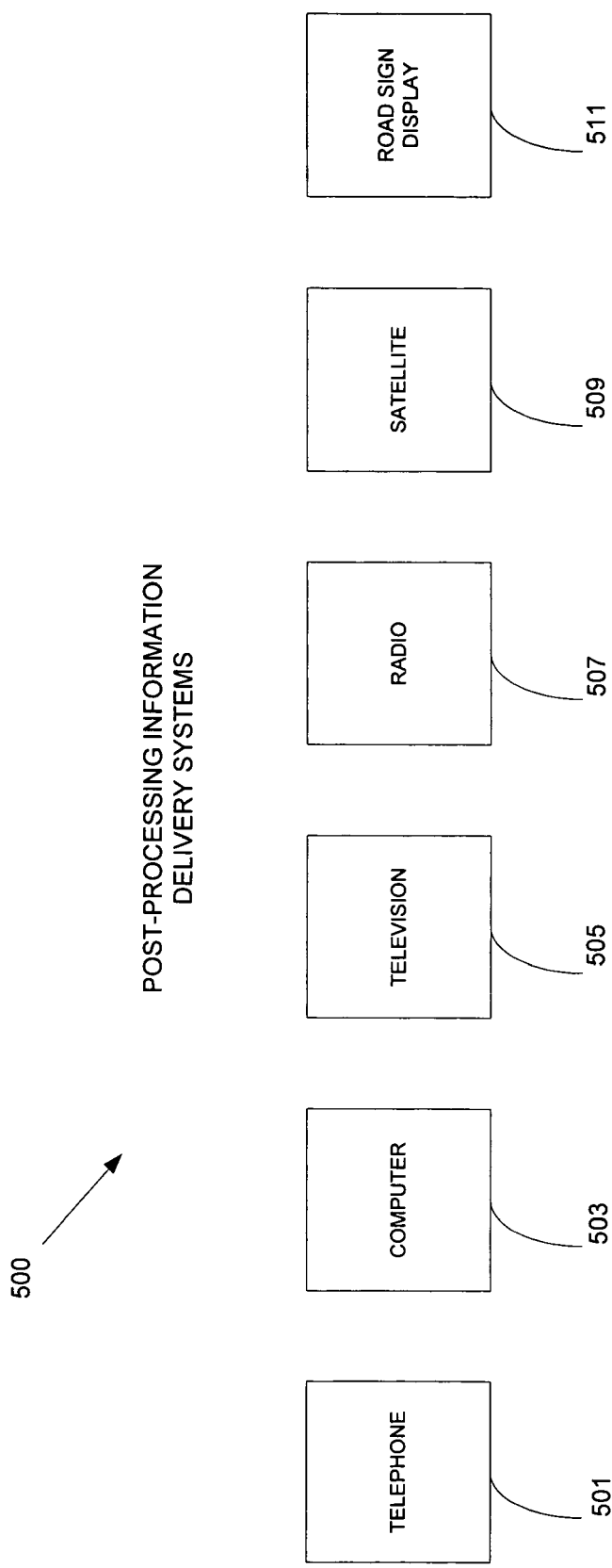
FIG. 5 is a diagram illustrating an embodiment of post-processing information delivery systems on the roadway travel data exchange network of FIG. 1, for example, in accordance with various aspects of the present invention.

FIG. 5 is a diagram illustrating an embodiment of post-processing information delivery systems on the roadway travel data exchange network of FIG. 1, for example, in accordance with various aspects of the present invention. Various post-processing information delivery systems 500 may be utilized in the retrieval/post-processing systems 113 of FIG. 1. Travel data communicated from the storage and processing system 117 may, for example, be delivered to a telephone 501, a computer 503, a television 505, a radio 507, a satellite 509, or a road sign display 511.

The telephone 501 may, for example, be a dedicated telephone line. Users of the roadway travel data exchange network may dial this dedicated phone line and hear a recorded message with specific travel data. The contents of the recorded message may be periodically updated with new travel data. Several post-processing information delivery systems may be utilized at the same time. For example, information about an accident may be displayed on a road sign display 511, while at the same time a radio 507 may broadcast information on alternate routes that may be utilized around the accident site.

Figure 6:
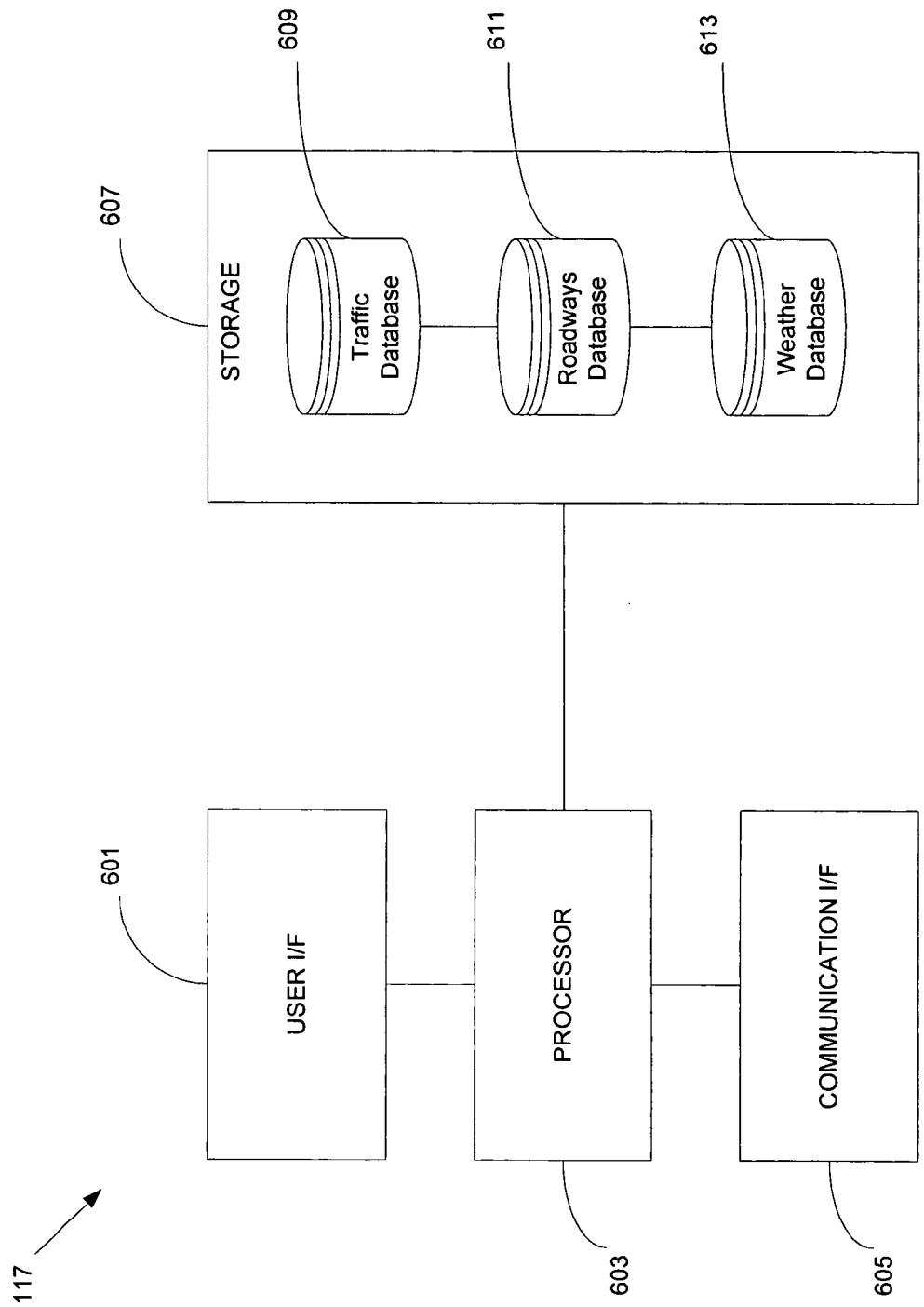
FIG. 6 is a diagram illustrating an embodiment of a storage and processing system on the roadway travel data exchange network of FIG. 1, for example, in accordance with various aspects of the present invention.

FIG. 6 is a diagram illustrating an embodiment of a storage and processing system on the roadway travel data exchange network of FIG. 1, for example, in accordance with various aspects of the present invention. The storage and processing system 117 comprises a communication interface 605 for communicating with the roadway travel data exchange network via the communication infrastructure 115. Travel data received by the storage and processing system 117 via the communication interface 605 is processed by a processor 603, and is subsequently stored in storage 607. The storage 607 comprises several databases, which are associated with the type of travel data they contain. For example, the storage 607 comprises a traffic database 609, a roadways database 611, and a weather database 613. The traffic database 609 stores all roadway travel data related to traffic. The roadways database 611 stores information about the specific geographic location of a roadway network and specific roadway characteristics, such as type of road, length, maximum allowed speed, number of lanes, etc. The weather database stores the weather-related data that is received from an supporting collection systems 105. The storage and processing system 117 may also comprise a user interface 601, which may allow an authorized user to directly input into the storage and processing system traffic-related, roadway-related, or weather-related information, or to edit existing information.

Figure 7:
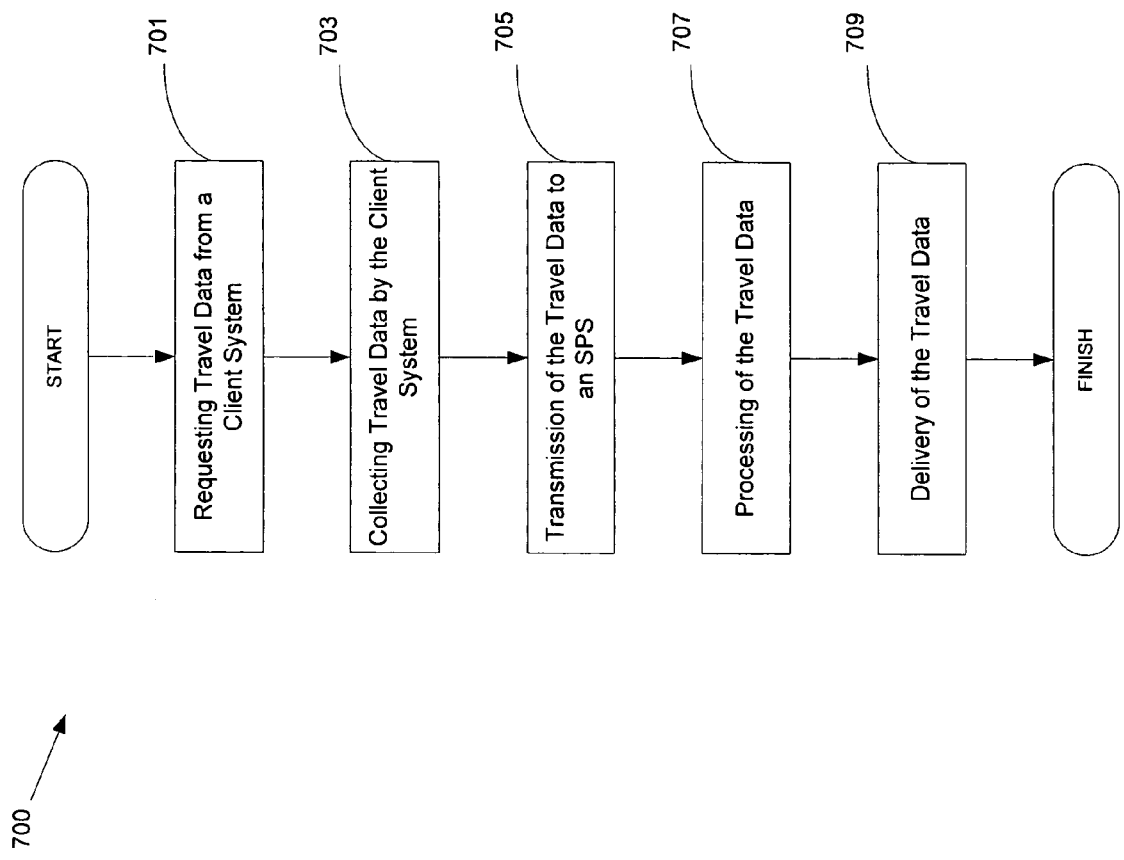
FIG. 7 is a flowchart illustrating a general embodiment of a method for collection and delivery of travel data on the roadway travel data exchange network of FIG. 1, for example, in accordance with various aspects of the present invention.

FIG. 7 is a flowchart illustrating a general embodiment of a method 700 for collection and delivery of travel data on the roadway travel data exchange network of FIG. 1, for example, in accordance with various aspects of the present invention. At 701, travel data is requested by a storage and processing system from a client system in a roadway travel data exchange network. At 703, a multipurpose client system or a dedicated client system collects the requested travel data. At 705, the plurality of client systems transmits the collected travel data to the storage and processing system via a communication infrastructure. After the travel data is processed by a storage and processing system processor at 707, the travel data is then delivered, in 709, from the storage and processing system to the same client system that collected the travel data, or to another client system.

Figure 8:
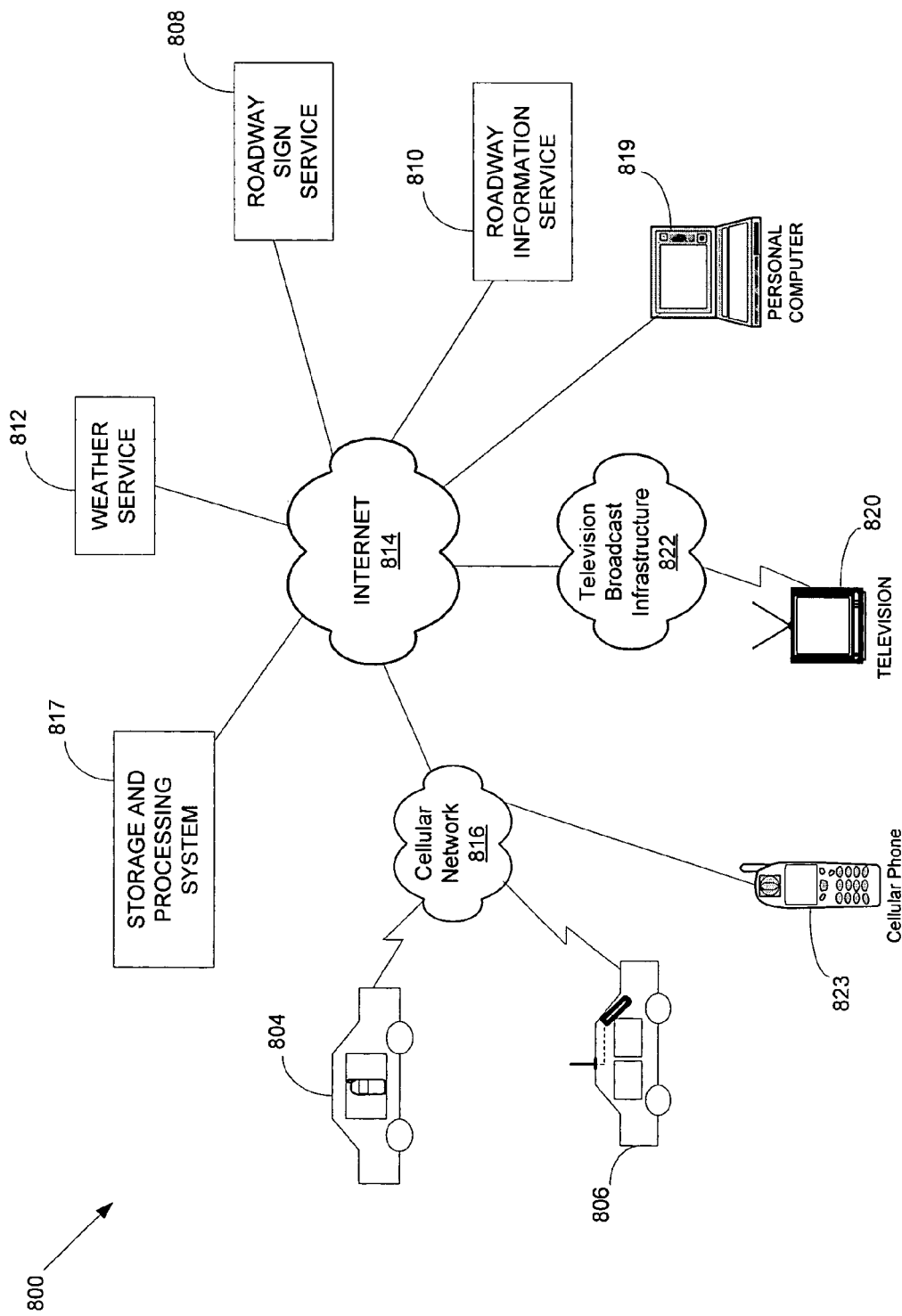
FIG. 8 is a diagram of an embodiment of the roadway travel data exchange network of FIG. 1, in accordance with various aspects of the present invention.

FIG. 8 is a diagram of an embodiment 800 of the roadway travel data exchange network of FIG. 1, in accordance with various aspects of the present invention. The roadway travel data exchange network 800 comprises a plurality of multipurpose portable client systems 804, a plurality of embedded client systems 806 with integrated navigation capability, a television 820, a personal computer 819, a cellular telephone 823, a roadway information service 810, a roadway sign service 808, a weather service 812, and a storage and processing system 817, all communicatively coupled to the Internet 814. The multipurpose portable client systems 804 and the embedded client systems 806 are communicatively coupled to the Internet 814 via a cellular network 816. The multipurpose portable client systems 804 may comprise, for example, cellular phones, personal digital assistants and laptop computers being operated in a vehicle.

The storage and processing system 817 receives travel related data periodically transmitted from the multipurpose portable client systems 804 and the embedded client systems 806, via the Internet 814 and the cellular network 816. In addition, the storage and processing system 817 receives travel related data through the Internet 814 from the weather service 812 and from the roadway information service 810. The weather service 812 may be any available service that provides weather-related data, such as a governmental agency or a scientific agency, for example, the National Weather Service. The roadway information service 810 may be one or more organizations that track travel related data, such as departments of transportation and/or news organizations.

The storage and processing system 817 processes the travel related data and then distributes the processed data, through the Internet 814 and the cellular network 816, to at least one of the multipurpose portable client systems 804 and the embedded client systems 806. Additionally, the storage and processing system 817 transmits processed travel related data to other client systems that were not involved in the collection of the original data. Such client systems may comprise a television 820, a cellular telephone 823, a personal computer 819 with Internet access, and roadway sign service 808. For example, processed data may be transmitted from the storage and processing system 817, via the Internet 814 and the television broadcast infrastructure 822, to the television 820. The storage and processing system 817 may also distribute the processed travel related data to be displayed on the roadway sign service 808. All the connections to and from the Internet 814 may be, for example, wired or wireless.

The roadway travel data exchange network 800 may be deployed to provide different services. For example, in one such service, a plurality of client systems 804, 806 collect information relating to their respective locations and/or velocities, and provide such information to the storage and processing system 817, via the cellular network 816 and the internet 814. The storage and processing system 817 processes the information to create a database of processed data representing current velocities for vehicles at various locations. A plurality of the client systems 804, 806, 819, 820, 823 send requests for information relating to particular locations to the storage and processing system 817 via the internet 814, cellular network 816 and/or television infrastructure 822. The storage and processing system 817 processes the requests and delivers to the plurality of client systems 804, 806, 819, 820, 823 data representing the velocities of vehicles at the requested locations.

The plurality of client systems 804, 806, 819, 820, 823 post-process the data received from the storage and processing system 817 to present the data visually or audibly, or to make further calculations based on such data, such as, for example, calculating the fastest route to a given destination given current traffic conditions. The data may additionally be combined with map travel data to present a visual display of traffic conditions for the roadways within a given area, for example, with different colors or levels of brightness used to represent different vehicle speeds at different locations on the roadways.

In another such service, a plurality of client systems 804, 806, 819, 820, 823 may track the location of a specified client system or systems 804, 806 located in another vehicle or vehicles. Specifically, the plurality of client systems 804, 806, 819, 820, 823 each may send instructions to the storage and processing system 817 via the internet 814, cellular network 816 and/or television infrastructure 822, representing a request for the location of a specified client system 804, 806. The storage and processing system 817 processes the request. If the storage and processing system 817 already contains the requested data, it then delivers it to the plurality of client systems 804, 806, 819, 820, 823. Otherwise, the storage and processing system 817 instructs the specified client system 804, 806, via the internet 814 and cellular network 816, to provide the requested data. The specified client system 804, 806 collects its location information and delivers it via the cellular network 816 and the internet 814 to the plurality of client systems 804, 806, 819, 820, 823, and/or to the storage and processing system 817 for further delivery, processing and/or storage. Of course, the plurality of client systems 804, 806, 819, 820, 823 alternatively may send instructions representing a request for the location of a specified client system 804, 806 directly to such client system 804, 806, via the internet 814, cellular network 816 and/or television infrastructure 822, rather than to the storage and processing system 817.

In one embodiment of the above service, a set of permissions is assigned to a given client system 804, 806 associated with a vehicle, such that neither the given client system 804, 806 nor the storage and processing system 817 will deliver information relating to the given client system 804, 806 to any other client system without prior authorization. The mechanism for assigning and changing permissions is protected by lock, password or other security device to assist in preventing unauthorized modification of such permissions. For example, a person traveling with a first client system in a first vehicle 804 may give permission for a person traveling with a second client system 806 in a second vehicle to track such first vehicle, to allow the second person to easily follow the first person to an unfamiliar destination. In another example, a parent may set the permissions in a client system associated with his or her child's vehicle 804, 806, to allow the parent to track the child's location via his or her cellular phone 823, television 820, personal computer 819 or vehicle 806.

In another such service, various forms of data may be delivered in real-time to the client systems 806 with integrated navigation capabilities, via the cellular network 816 and the internet 814, from a personal computer 819 or cellular telephone 823. Such data may comprise text, audio and/or video, and may be delivered at the request of the client system 806 with integrated navigation capabilities or at the request of the sending client 819, 823. Similarly, data may be delivered from the client systems 806 with integrated navigation capabilities, via the cellular network 816 and the internet 814, from a personal computer 819 or cellular telephone 823. For example, a client system 806 may comprise or be communicatively coupled with a video camera within the associated vehicle, and may collect video data for delivery to a personal computer 819, such that the user of the personal computer may provide real-time directions or otherwise communicate in real-time with the user of the client system 806 with integrated navigation capabilities.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A roadway information system associated with a first roadway vehicle and a second roadway vehicle, the information system comprising:
   a first mobile client system associated with the first roadway vehicle;
   a second mobile client system associated with the second roadway vehicle;
   a wireless communication network;
   a processing system communicatively coupled to the wireless communication network;
   the first mobile client system delivers first travel related data to the processing system via the wireless communication network; and
   the processing system delivers second travel related data to the second mobile client system via the wireless communication network, the second travel related data relating at least in part to the first travel related data,
   wherein the second mobile client system monitors travel data related to the second roadway vehicle, and wherein the second mobile client system enables communication of at least a portion of the delivered second travel related data to the first mobile client system.

2. The roadway information system of claim 1, further comprising:
   a third mobile client system associated with a third roadway vehicle, the third mobile client system delivering third travel related data to the processing system via the wireless communication network, and
   the second travel related data relates at least in part to the first travel related data and the third travel related data.

3. The roadway information system of claim 1, further comprising:
   a third mobile client system associated with a third roadway vehicle, the third mobile client system delivering third travel related data to the processing system via the wireless communication network, and
   the first travel related data and the third travel related data are used to generate the second travel related data.

4. The roadway information system of claim 1, wherein the processing system comprises at least one information database.

5. The roadway information system of claim 1, wherein the wireless communication network comprises an Internet infrastructure.

6. The roadway information system of claim 1, wherein the first mobile client system comprises a monitoring interface, the monitoring interface for collecting travel related data.

7. The roadway information system of claim 6, wherein the monitoring interface communicatively couples with an automotive system.

8. The roadway information system of claim 1, wherein the travel related data comprises a location information.

9. The roadway information system of claim 1, wherein the first travel related data is related to the first roadway vehicle.

10. The roadway information system of claim 1, wherein at least one of the first mobile client system and the second mobile client system comprise a navigation system.

11. The roadway information system of claim 1, wherein the processing system utilizes at least one of the first travel related data and a supplemental data to generate the second travel related data.

12. A roadway information system comprising:
 a wireless communication network;
 a plurality of Mobile client systems communicatively coupled to the wireless communication network;
 a processing system communicatively coupled to the wireless communication network;
 each of the plurality of mobile client systems delivering travel related information via the wireless communication network; and
 the processing system generating and communicating data based on the travel related information delivered by each of the plurality of mobile client systems,
 wherein each of the plurality of mobile client systems monitors its own travel related information.

13. The roadway intonation system of claim 12, wherein the wireless communication network comprises an Internet infrastructure.

14. The roadway information system of claim 12, wherein the travel related information comprises a location information.

15. The roadway information system of claim 12, further comprising:
 a plurality of travel information delivery systems, each of the plurality of travel information delivery systems for delivering the processed data.

16. The roadway information system of claim 15, wherein the plurality of travel information delivery systems comprise a telephone.

17. The roadway information system of claim 15, wherein the plurality of travel information delivery systems comprise a television.

18. The roadway information system of claim 15, wherein the plurality of travel information delivery systems comprise a road sign display.

19. A method for processing travel related data in a roadway information system, the method comprising:
 delivering a first travel related data by a first mobile client system to a processing system via a wireless communication network, the first mobile client system associated with a first roadway vehicle;
 generating a second travel related data by the processing system, the second travel related data related at least in part to the first travel related data; and
 delivering the second travel related data by the processing system to a second mobile client system via the wireless communication network, the second mobile client system associated with a second roadway vehicle,
 wherein the second mobile client system monitors a third client related data related to the second mobile client system, and wherein the second mobile client system enables communication ci at least a portion of the delivered second travel related data to the first mobile client system.

20. The method of claim 19, wherein the travel related date comprises a vehicle speed information.

21. The method of claim 19, wherein the travel related data comprises information associated with the first roadway vehicle.

* * * * *